W. E. CLOW.
SYSTEM OF APPARATUS FOR CASTING PIPE AND OTHER HOLLOW ARTICLES.
APPLICATION FILED FEB. 7, 1910.

1,025,123.

Patented May 7, 1912.

W. E. CLOW.
SYSTEM OF APPARATUS FOR CASTING PIPE AND OTHER HOLLOW ARTICLES.
APPLICATION FILED FEB. 7, 1910.

1,025,123.

Patented May 7, 1912.

Witnesses:—

Inventor:—
William E. Clow
By:—
Atty.

W. E. CLOW.
SYSTEM OF APPARATUS FOR CASTING PIPE AND OTHER HOLLOW ARTICLES.
APPLICATION FILED FEB. 7, 1910.

1,025,123.

Patented May 7, 1912.

Witnesses:—

Inventor:—
William E. Clow
By:—
Atty.

UNITED STATES PATENT OFFICE.

WILLIAM E. CLOW, OF CHICAGO, ILLINOIS.

SYSTEM OF APPARATUS FOR CASTING PIPE AND OTHER HOLLOW ARTICLES.

1,025,123.  Specification of Letters Patent.  Patented May 7, 1912.

Application filed February 7, 1910. Serial No. 542,597.

*To all whom it may concern:*

Be it known that I, WILLIAM E. CLOW, a citizen of the United States, residing at Chicago, in the county of Cook and State of Illinois, have invented certain new and useful Improvements in Systems of Apparatus for Casting Pipe and other Hollow Articles, of which the following is a specification.

The specific object aimed at by the present invention was the providing of improved means for making cast iron pipe, and this specification will be confined to this particular use of the invention, reserving to myself, however, the exclusive right to use any or all of its several novel features for any and all purposes for which they may be found to be desirable.

In the process of casting pipe, certain essential steps must be taken and certain apparatus for carrying out or performing these several steps must be used, and, furthermore, at least some of these steps must be taken in an order or sequence which is invariable in its essential particulars. That is to say: There must be a flask adapted to have formed therein the sand mold in which the pipe is cast. The sand for forming this mold is first introduced into the flask and then rammed around a pattern. Before introducing the sand it is preferable to insert in the flask, a so called displacing tube which leaves between it and the inner surface of the flask an annular space into which the sand is introduced and then rammed in order to pack it and make it of the necessary density, which should be as nearly uniform throughout the entire mass as possible, in order to avoid imperfections. This packing is preferably done by forcing upward through the body of sand a pattern adapted to give to the interior of the sand mold a shape which is complemental to the shape which it is decreed to give to the exterior of the completed pipe. This pattern is carried and operated by the plunger of a hydraulic press and the lower end of the displacing tube is seated upon and carried by the plunger so that as the plunger and pattern move upward the displacing tube is ejected at the upper end of the flask. I desire to have it understood, however, that the present invention is not limited to this or any other particular means for forming the mold. By whatever means it is formed, its interior surface is then "black-washed", and next it is baked or dried in an oven or an equivalent drying apparatus. After it is dried the core is set in the mold and after this is done the molten metal is poured in to cast the pipe. The core itself may comprise one or more core-sections, depending upon the necessities of individual cases. In some instances the bottom section of the core must be formed and baked separately from the body or main section of the core and secured in place at the lower end of the flask, and all of this work is preferably done on a level below the main working level of the plant. After the cast metal has been allowed to stand a sufficient length of time to freeze, the core bar is drawn, the flask is then opened and the newly-cast pipe removed and the flask is then "shaken out". The matter shaken out of the flask falls into what is known as the "sand pit", which is a pit in the bottom of the main pit, from which it is removed, preferably by an endless conveyer, treated to make it again available for use, and conveyed to a hopper by which it is again introduced into a flask, packed (or "rammed", as it is usually called) and treated as before. According to the present invention all of these several steps are taken or performed consecutively, as one continuous series of operations, during which the flask travels continuously, step by step, throughout a continuous circuit, and it is unnecessary to cause the flask to leave or deviate from this circuit for any purpose whatever. In this respect the present system differs from anything heretofore practised in the art, and in order to accomplish it the several devices or apparatus, or what may appropriately be termed "sub-apparatus" going to make up the complete apparatus or system, must be arranged in a similar order or sequence. Meanwhile the making of the cores proceeds through a consecutive or successive series of steps which include, first winding the core bar with a rope made of suitable fiber and simultaneously applying to the latter the first coat of mud; then removing it to an oven where the first coat is dried; then removing it and giving it the second coat of mud; then black-washing it and then removing it to an oven where the second coat is dried, thus completing the core. According to systems heretofore practised, the core was then stored until it was needed for setting it, but according to the present invention it is taken directly from the finishing oven and immediately set, thus avoiding unnecessarily handling it a number of times or transporting it through considerable distances. All of these several steps in the process of making pipe are admittedly old in the art, but a very serious objection to systems heretofore followed in carrying out the process is that they necessitated the frequent handling of the molds, cores and other paraphernalia, often between remote places or points, and this, in one way or another, entailed a cost of manufacture which far exceeds what the cost will be if the process is carried out by apparatus arranged according to the system which forms the subject of the present invention. Among the things which contribute to this higher cost of manufacture when old systems are followed, as compared with the cost of manufacture when the present system is followed, may be mentioned the following, to wit: the relative areas of the foundry space required, the apparatus of the present system being arranged in the most compact manner possible, with a view to economy of space; the relative costs of moving from place to place the paraphernalia, commodities, etc., which must necessarily be handled in carrying out the process; the relative percentages of damage and injury to the completed molds and cores as a result of the difference in the manner and number of times they are handled; the cost of transporting the paraphernalia, commodities, etc., through many and long distances as compared with but few and short distances; the relative dissipation and consequent waste of heat incident to the lapse of time required in transporting the flask from the point at which it is taken from the drying oven back to the point at which they again enter said oven.

Briefly stated, the object of the present invention is to provide a system of apparatus by which these objections to the old systems will be overcome to as great an extent as possible, and in carrying out this object I arrange the paraphernalia or several apparatus in such relations to each other as to form a continuous system or circuit whereby the distance which must be traversed by the several parts in passing step by step throughout the entire circuit is reduced to a minimum and at the same time all jarring of the molds and cores, which would result from violent or frequent bodily handling is eliminated. By this means the flasks will be brought successively into proper positions for carrying out the essential steps of the process in the necessarily invariable sequence, the space allowed for carrying out each step being only sufficient for its requirements, plus a margin of safety or certainty to meet unusual conditions. Similarly the core bars traverse a circuit including the necessary apparatus of paraphernalia and the number of times which the cores must be handled is reduced to a minimum. The flask circuit and core bar circuit intercept each other, as it were, so that the completed cores may be taken from the finishing oven at the precise point at which they are to be set.

To these ends the invention consists in the features of novelty that are hereinafter described with reference to the accompanying drawings which are made a part of this specification and in which:

Figure 1:
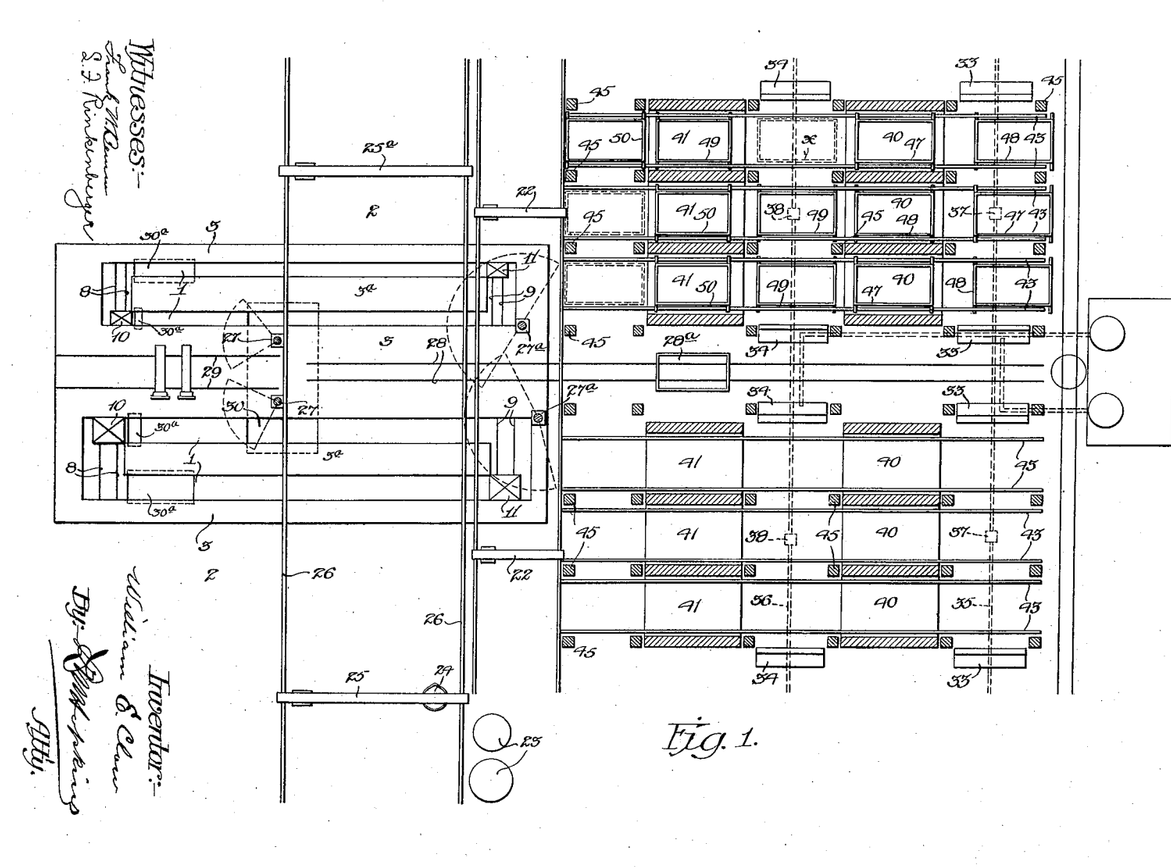
Figure 1 is a ground plan diagrammatically representing a double system of apparatus embodying the invention.
Figure 2:
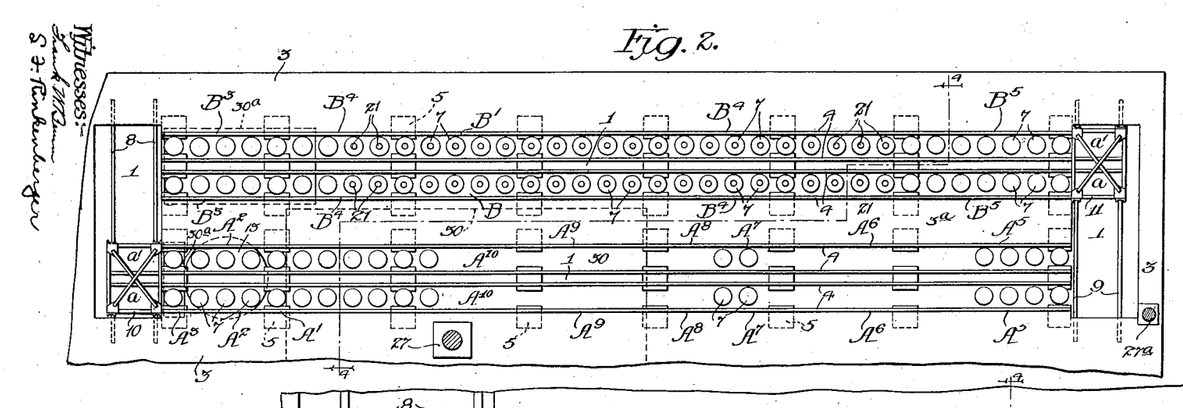
Fig. 2 is a similar view, on a somewhat larger scale, of the "pit" and the parts accessory thereto, of a single system of apparatus embodying the invention.

In the drawings 1 represents what is commonly called the "pit." Usually it is in fact a pit which is sunk in the ground which usually forms the main or working floor, 2, and downward for a considerable distance from the level of said main floor, and is of sufficient length and width to provide the necessary space for handling the flasks, etc., and according to the present invention this pit is of appropriate size to meet the requirements of either a double system, as shown in Fig. 1, or a single system, as shown in Fig. 2. As will be seen at a glance, a double system differs from a single system principally in a duplication and a reversal of the relative locations of some of the parts, and hence the following description will be confined to a single system, excepting where it becomes necessary to make a distinction between the two systems.

The pit is surrounded by a platform, 3, located at the main or working floor level and this platform affords stands for the workmen for carrying out such successive steps of the process as involve the handling of the flasks.

Figure 3:
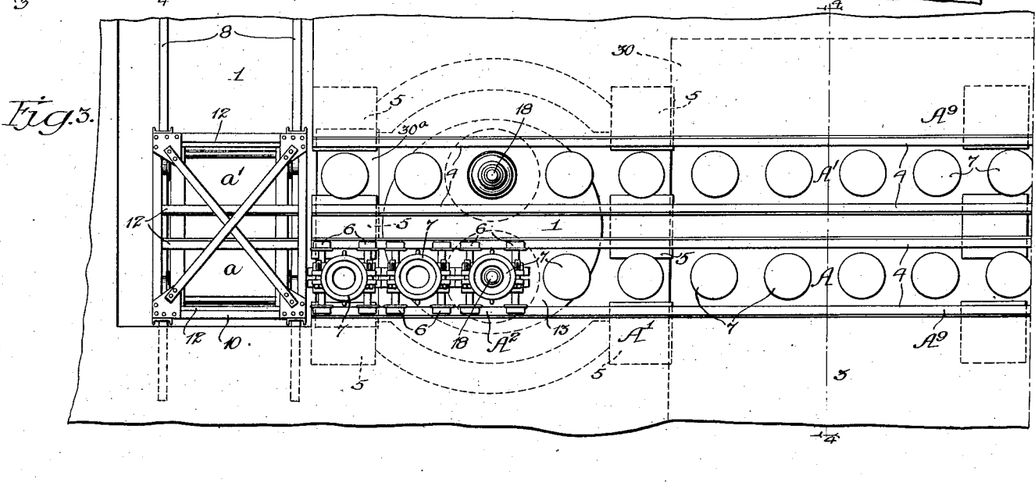
Fig. 3 is a plan view of a portion thereof on a still larger scale.
Figure 5:
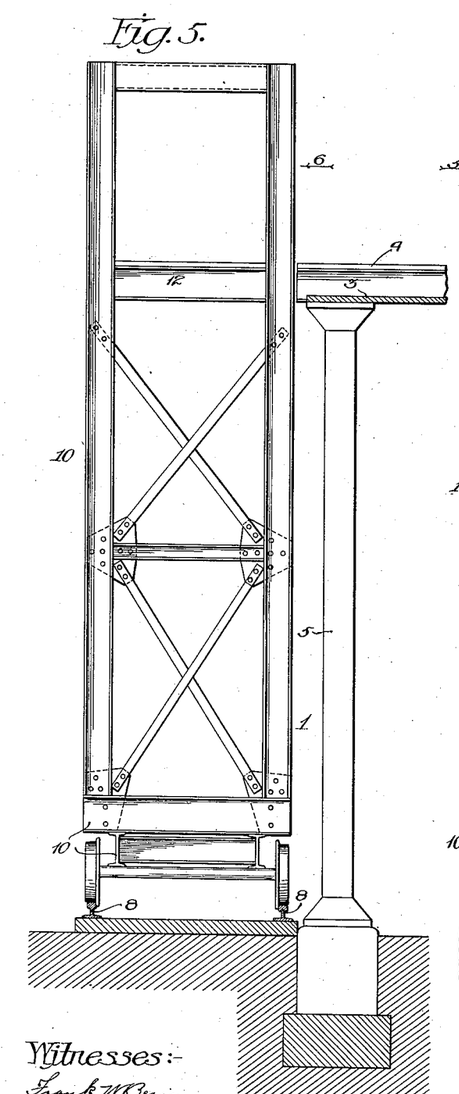
Figs. 5 and 6 are elevations of one of the transfer trucks viewed in directions at right angles to each other as indicated by the arrows 5 and 6, respectively.
Figure 6:
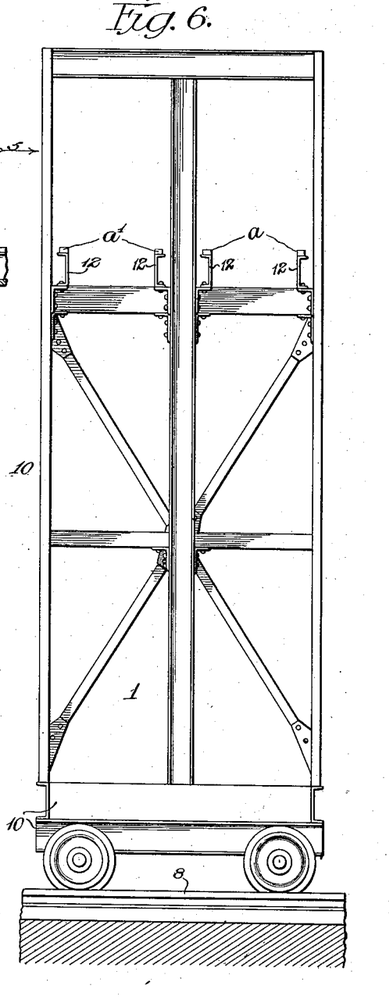
Figures 7, 8:
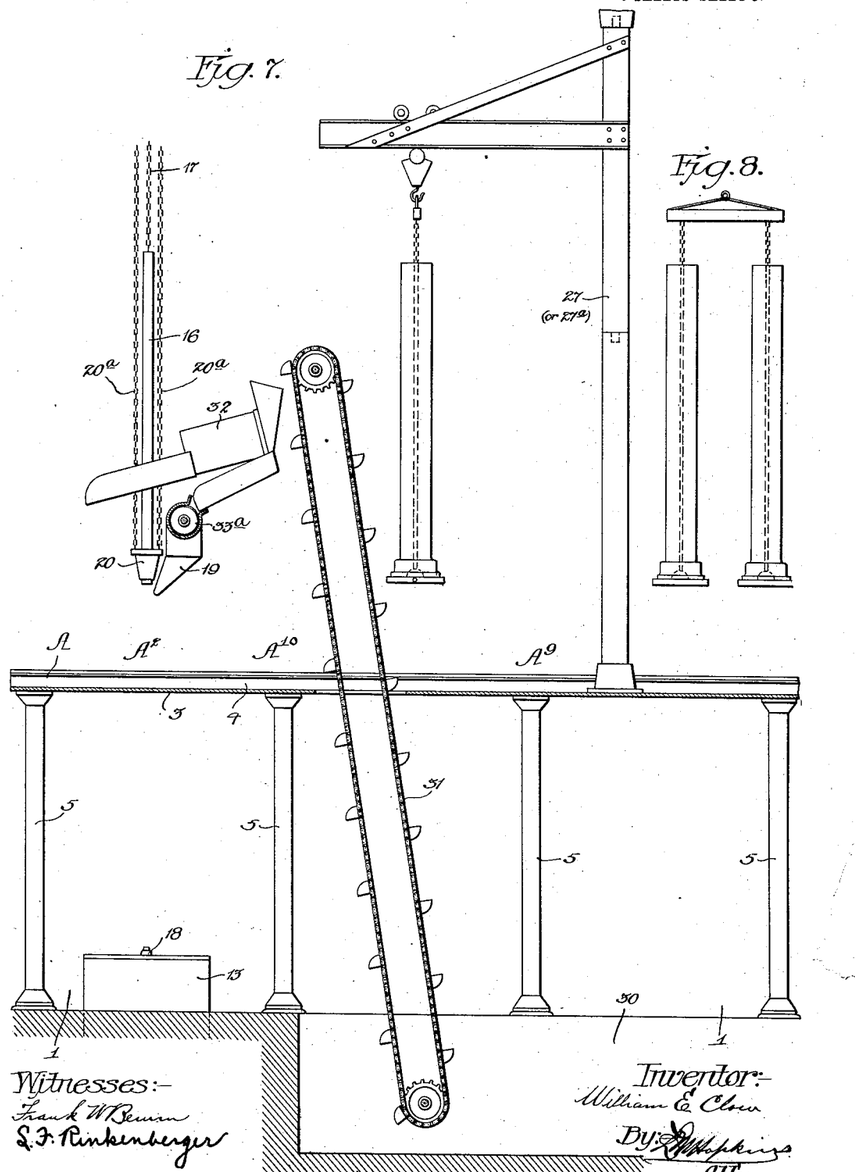
Fig. 7 is a view showing some of the parts in side elevation and others in vertical longitudinal section.
Fig. 8 is an elevation of a detail of the shake-out crane.
Figures 9, 10:
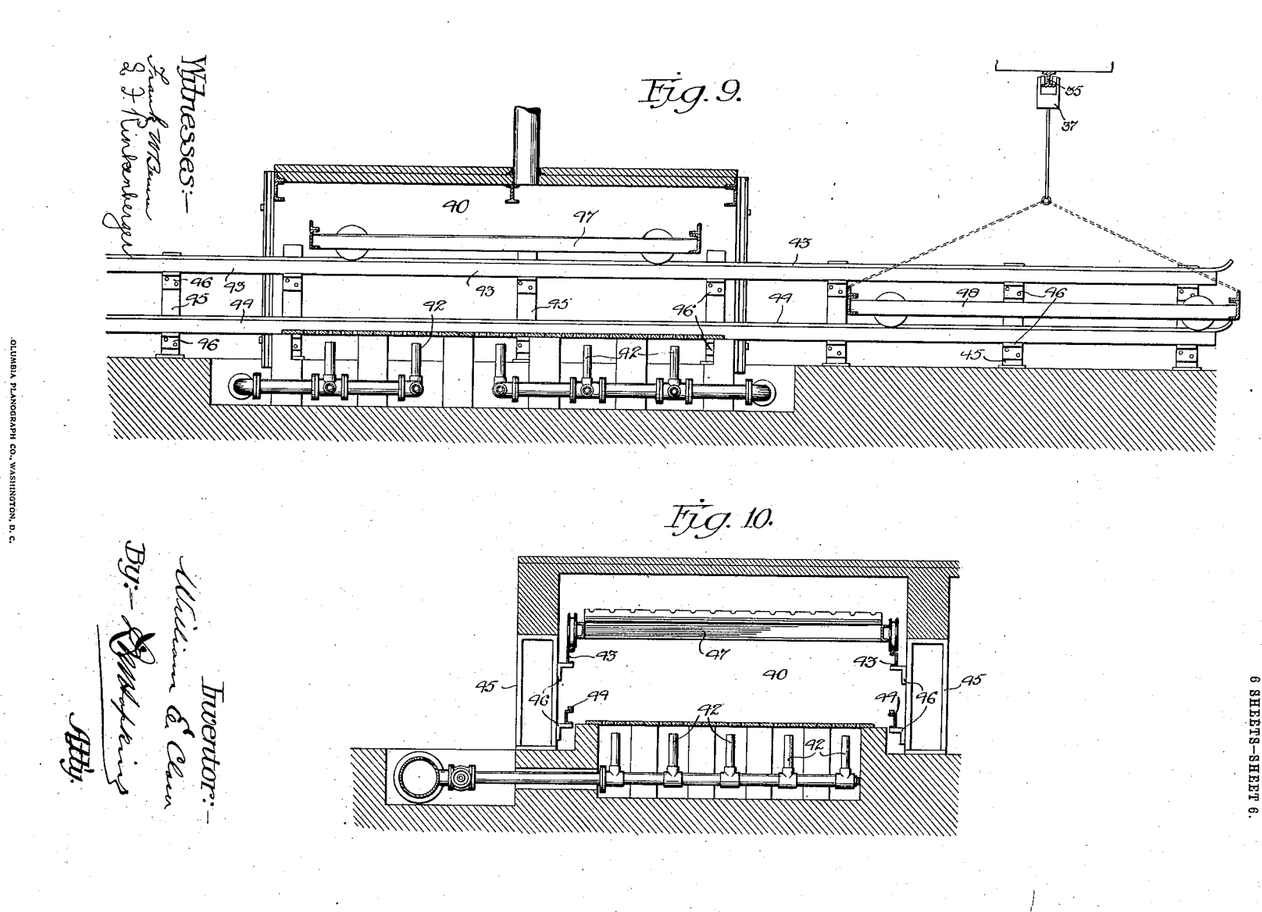
Figs. 9 and 10 are, respectively, a vertical longitudinal and a vertical transverse section of one of the first-coat core ovens and its accessories.

Located within the pit and at about the level of the platform is a plurality of parallel rails, 4, which are parallel with the sides of the pit and extend continuously to within a short distance of each of its ends. They are fixedly secured to and supported by stationary columns, 5, and constitute tracks upon which wheels, 6, journaled to shafts by which the flasks, 7, are carried, and adapted to run, the arrangement of the rails and wheels being such that the flasks may travel from one end of the pit to the other. Fig. 2 of the drawings shows eight of these rails which considered in pairs, constitute four tracks, A, A', B and B', respectively, the tracks A and A' being located at the same side of the tracks B and B', the tracks A and A' being used for running the flasks in one direction while the tracks B and B' are used for running the flasks in the opposite direction. Either a greater or less number of tracks may be used, so long as they provide for running the flasks first in one direction on one track and then in the opposite direction on another track. Furthermore each track may be of any suitable construction, so long as it will support the flask and permit its rollers to travel along it. At the ends of the tracks are transfer tracks, 8 and 9, respectively, which are at right angles to the tracks aforesaid, and upon each of these transfer tracks runs a truck, 10 and 11, respectively, which trucks are of similar construction and are clearly shown in Figs. 3, 5 and 6. The transfer tracks are located at the bottom of the pit, or at a level below the level of the lower ends of the flasks, as they are supported by the track rails 4, and the frames of the trucks extend upward to a level at least as high as the tops of the rails 4 and carry parallel rails 12 which are located at the same level as the rails 4 and are arranged in pairs to form short tracks, $a$ and $a'$, adapted to register, or to be brought in precise alinement with the tracks A and A' or with the tracks B and B', depending upon the positions of the trucks on the transfer tracks. With this arrangement it will be seen that when one or more flasks reaches the (say, left hand,) ends of the tracks A and A' they may be run on to the tracks $a$ and $a'$ of the truck 10, and, by moving the truck along the transfer track, 8, said tracks $a$ and $a'$ may be brought into alinement with the corresponding ends of the tracks B and B', respectively. The truck 11 may be similarly manipulated or handled to make its tracks $a$ and $a'$ register with the tracks A and A' or B and B', respectively. Hence, it may be said that the tracks A and B, when taken in connection with the tracks $a$ and $a$ of the trucks 10 and 11, respectively, and the tracks 8 and 9, form a complete circuit through which each of the flasks may travel. And so with the tracks A' and B' and the tracks $a'$ and $a'$. With this arrangement, either the entire system as shown in Fig. 2 or only one-half of that system may be used as desired. That is to say, all of the tracks may be used at their full capacity, or, if desired, only a sufficient number of them to form one complete railway circuit may be used, at a proportionate rate of running expenditure, excepting what is represented by the then inactive portion of the system. The trucks 10 and 11 may be of sufficient width, considered with relation to the length of the transfer tracks, to receive either one or more than one flask, and are preferably made to receive two or three, depending upon the diameters of the flasks, and may be of sufficient length to carry one or more of the short tracks $a$, $a'$, so that each transfer truck with its short movable tracks may serve either one or more of the stationary tracks, as desired.

Separate successive sections of the stationary tracks are set apart or used for supporting the flasks while the essential steps of the process are taken or performed consecutively and in their essential order or sequence, and suitable apparatus appropriate for performing the several operations are located in proximity the several track sections set apart and appropriated to them, respectively. The closing and securing together of the two longitudinal sections of the flask is done as the flask rests upon the section $A^{10}$ of the stationary track, A, and this may be taken as the starting point in the following description of the system followed in carrying out the process. The flask, having been closed, is advanced, one step, to the section $A^2$. At this point a hydraulic ram, 13, is arranged in a well which is sunk at the bottom of the pit so that in its inactive position all of its parts are below the level of the lower end of the flask. A disk 14 operated by auxiliary hydraulic mechanism (not shown) is then elevated sufficiently to bring it in contact with the bottom of the flask, against which it is firmly clamped, said disk being provided with a pattern-section 15 appropriate to the formation which it is desired to give to the interior of the lower end of the completed pipe. A displacing tube 16 which passes through a pattern, 20, with a snug fit is then inserted in the flask from above and lowered by a suitable hoisting device 17 until it comes to a bearing on a shoulder $18^a$ on the upper end of the main pattern section 18 which latter passes through the pattern section, 15, with a snug fit. The annular space between the flask and displacing tube is then filled with sand from a hopper, 19, and this done a pattern section, 20, appropriate to formation of the interior of the upper end of the pipe is then lowered by a suitable hoisting device $20^a$ until it comes to a bearing on the upper end of the flask, to which it is thereafter secured. The plunger (not shown) of the main hydraulic press or ram, 13, which carries the main section 18 of the pattern, or the section for forming the main or body portion of the mold in the flask, is then forced upward, forcing the pattern completely through the body of sand, and carrying with it the displacing tube, whereby the sand is rammed or displaced laterally and packed uniformly throughout the entire mass. The details in the construction of the parts bearing the reference numbers 13 to 20ª, inclusive, form no part of the present invention and hence are not fully shown by the drawings. In this respect the drawings are more or less diagrammatic but amply sufficient to enable anyone skilled in the art to understand and make use of the invention. These parts are similar in mode of operation to those shown in Patent No. 878,064 granted February 4, 1908, to Fred Herbert, although they differ somewhat in their details in construction. The plunger of the ram is then retracted, thereby drawing downward the main pattern section 18, the ring 14 and pattern section 15, and the upper pattern section 20, then lifted, thereby leaving the flask, with the wet sand mold in it, free to be advanced to the section A², where the mold is black-washed over the black-well 30ª. The flask is then run on to the track $a$ of the transfer truck 10 and the transfer truck then run along the transfer track 8 until the track $a$ registers with the track B, the first section B³ of which may be also used for black-washing, if desired. This, however, is immaterial, and instead of thus dividing the black-washing station into two divisions one located at the side of the track A and the other at the side of the track B, it may all be located at the side of either track, the essential requisite in this respect being that it shall be between the ramming and drying track-sections. The flask is then run on to the section B⁴ and directly over the first of a row or series of burners, 21, which are arranged at the bottom of the pit in a line which is central relatively to the track, said burners being regularly spaced apart at intervals equal to the distance between the centers of two flasks abutting against each other. These operations are continued and the flasks accumulating on the delivery side of the rammer advanced from one to the next of a sufficient number of lighted burners to sufficiently dry each of the molds in succession, it being the intention to use or keep lighted only so many burners as are necessary to dry the molds, a number somewhat in excess of the estimated necessary number being provided, however, in order to meet the requirements of extreme conditions.

Figure 4:
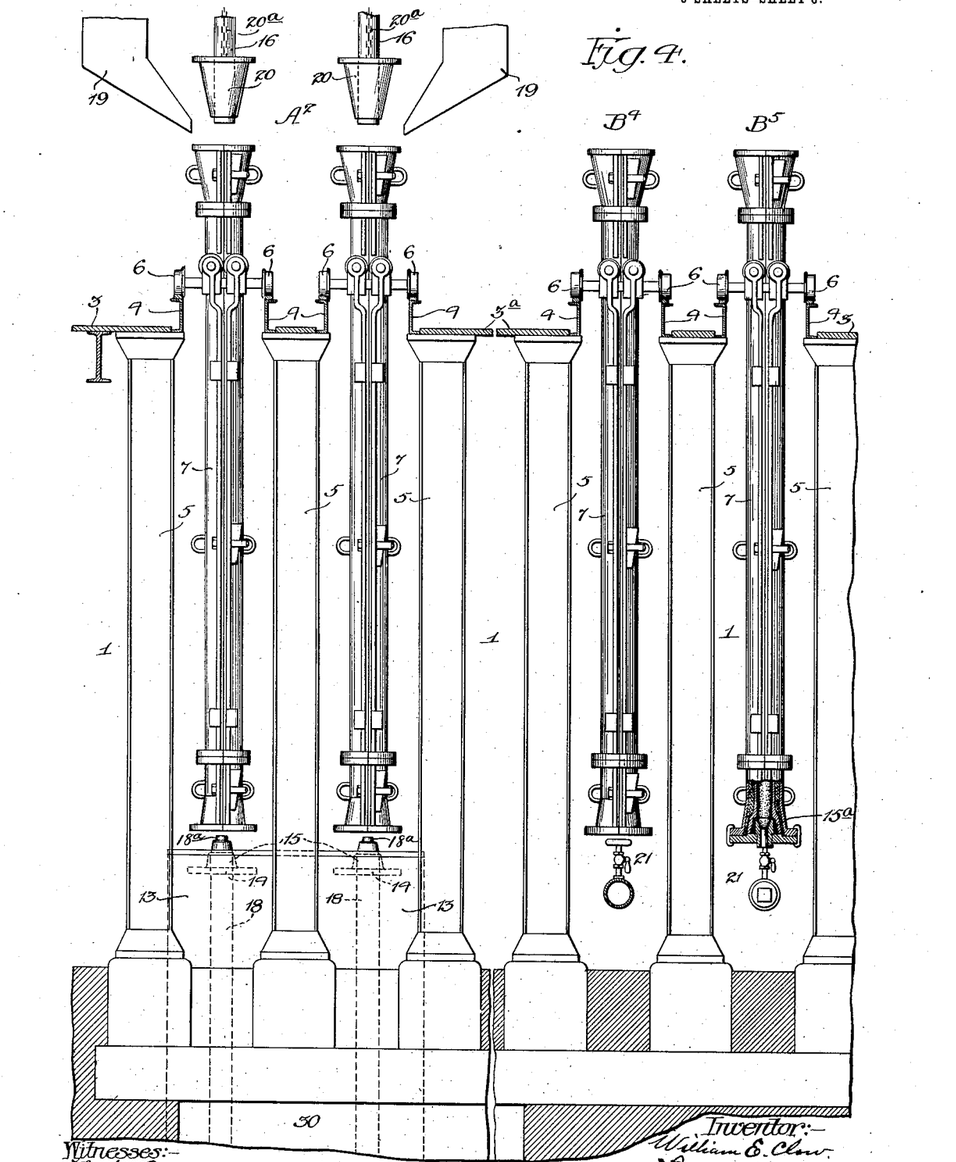
Fig. 4 is a vertical transverse section thereof on the line 4—4, Fig. 3.

After being dried the flask is run on to the section B⁵, where the completed core is inserted in the mold from above by a suitable crane or other hoisting device 22 (or 27ª) having a sweep or travel that will reach this point for this purpose. But before the main core-section 18ª is inserted and while the flask is still on the section B⁵ a core-section 15ª appropriate to the formation of the interior of the lower end of the pipe is first secured to the lower end of the flask as shown in Fig. 4, or in customary manner. When the core-sections 15ª and 18ª have been set, a core section (not shown) appropriate to the formation of the upper end of the pipe is then put in place on the upper end of the flask and secured thereto and the flask is then run onto a track $a$ of the transfer truck 11, and the truck run along its track 9 until its track $a$ again registers with the track A, onto which the flask is again run. The first section A⁵ of the track A may be used for setting the cores, if desired, but this is immaterial, and instead of thus dividing the core setting station into two divisions, one located at the side of the track B and the other at the side of the track A, it may be located at the side of either track, the essential requisite in this respect being that it shall be between the drying and casting track-sections. The flask is then run along the track A to the section A⁶ where the molten metal is run into the mold to cast the pipe. For this purpose the molten metal is carried from a cupola 23 to the track section A⁶ in a suitable pouring ladle 24, by a traveling crane 25 running upon railways 26. After the metal is cast the flask is advanced to the section A⁷ where the cast metal is allowed to freeze, and for this purpose the necessary length of track intervenes between the section A⁶ and the section A⁸ at which latter the core bar is drawn. For this purpose a crane 27 or other suitable hoisting device is used. For example a second crane 25ª, similar to the crane 25 and running on the tracks 26, may be provided and any of them may be used for doing any of the work that is within their sweep or travel. In any event the crane used for this purpose must have a sufficient sweep or range to cover the track section A⁸ and also a track 28 on which runs a truck 28ª onto which the crane deposits the core bars and by which they are returned to the point at which the making of the core is commenced.

After the core bar is drawn the flask is advanced to the section A⁹ where it is opened, the newly cast pipe withdrawn and deposited upon a track or skid, 29, upon which it is carried away to be cleaned. The crane 27 may be used for this purpose alone or it may also be used for drawing the core bars and on the other hand either or both of the cranes 25 and 25ª may be used for doing or assisting in doing any of this work. The flask may be shaken out at the section A⁹, or at any point before it passes beyond a pit, 30, which is sunk below the floor of the main pit, 1, and is technically known as the sand pit. The sand is removed from the sand pit, 30, by a conveyer 31 and by it elevated and delivered to a mill, sieve or other suitable device, 32, by which it is treated for breaking up the lumps and removing large particles of matter that are not suitable for reuse in making the molds. From the mill, 32, the refined sand is delivered into a mixing conveyer, 33ª, where it is mixed with the necessary quantity of water and delivered to the hoppers, 19, by which it is discharged into the flasks.

I desire to have it understood that the present invention is not concerned with means or apparatus of any particular construction for elevating the sand from the sand pit, treating it to restore it to proper condition for reuse, and thereafter conveying it to the flasks, nor is it concerned with an apparatus of any particular construction for ramming and packing the sand in the flasks in the process of forming the molds. Some of the means or mechanism for performing this work are merely indicated or shown diagrammatically in the drawings but for a full description of means or mechanism for doing similar work reference may be had to Patent No. 878,064, granted February 4th, 1908 to F. Herbert.

The foregoing description relates specifically to the stationary tracks A and B and their accessories, or, in other words, to a single system of apparatus arranged in a continuous circuit, but it is equally applicable to a plurality of such systems. The plant diagrammatically represented in Fig. 1 of the drawings indicates four such systems arranged in two pairs but it is manifest that any one or more of said systems may be used, leaving one or more of them out of use, thereby providing for a wide range in the elasticity in the output of the plant at a proportional expense.

Simultaneously with the carrying on of the above described operations the cores are made and are made at an exact rate which will meet the capacity of the apparatus already described, the cores being made by an apparatus or system of apparatus so located with relation to the pit that the completed core emerges from the core making apparatus at such a point that it may be taken from the core apparatus and set directly, thus dispensing with core-storage rooms and avoiding the handling which would be incident thereto.

It will be understood that in making the cores a core bar is first wound with a rope or strand of twisted hay or other suitable combustible fiber and the winding, as it proceeds, is coated with a layer of mud called the first coat. It is then placed in an oven and dried or baked, and when sufficiently dried it is removed, and given a second coat of mud and black-washed. It is then placed in a second-coat oven, and when sufficiently dried it is removed complete and in readiness to be set. The drawings show six ovens for drying the first coat, arranged in two banks each comprising three of said ovens arranged side by side and a similar number of ovens for drying the second coat, similarly arranged, the first coat and second coat ovens being arranged end to end and at a sufficient distance apart to leave between them ample space for handling the partly finished cores in the manner hereinafter described. All of the ovens being of like construction and having similar accessories, the following description will be confined to two alined ovens (one first and one second) excepting when it becomes necessary to refer to the others. The winding and first-coat core benches are shown at 33 and the second-coat core benches at 34. Overhead tracks, 35 and 36, extend transversely across all of the core benches 33 and 34 respectively, and upon these tracks run electric or other hoists, 37 and 38, respectively, by which the core bars, or the partly finished cores, may be moved from place to place. The first and second coat ovens are shown at 40 and 41, respectively. Each of them is open at both ends, a suitable door being provided for closing them when desired and each of them has beneath its perforated floor suitable gas burners, 42, for heating it. Arranged one above the other, and a suitable distance apart, are two tracks, 43 and 44, each consisting of a pair of parallel rails, preferably of channel iron, supported by any suitable means, suitably disposed posts, 45, to which are secured brackets, 46, being shown for this purpose. Each of the tracks, 43 and 44, extends continuously from a point in rear of the first coat oven to a point in front of the second coat oven, passing through the both ovens and also traversing the working space between the two ovens, their end portions which extend beyond the ovens being of somewhat greater length than the cores to accommodate core trucks which run upon the tracks and on to which the cores are loaded and unloaded, as will presently appear. Upon the respective upper and lower tracks are core trucks, 47 and 48, respectively, for serving the first coat oven and also core trucks 49 and 50 for serving the second coat oven. The trucks for the respective ovens are intended to be operated reciprocally so that when one is within the oven, loaded with partially completed cores being dried, the other is outside of the oven, either at its receiving end or at its delivery end and the drying capacity of the oven and the working capacity of the core makers are so regulated that it requires practically the same length of time to dry one batch or truck load of cores as another batch or truck load requires to be coated. For instance let it be assumed that the truck 47 is standing on the track 43 outside of the rear or receiving end of the oven and that it is being loaded with cores having the first coat. When the load is completed the truck 47 is run into the oven and allowed to remain and the truck 48 is in position to be loaded with another batch of cores having only the first coat. The truck 47 is then advanced on the track 43 and left in the first-coat oven 40, while the truck 48 is on the track 44 at the receiving end of said oven in position to be loaded with a new batch of first-coat cores, the drying of the cores on the truck 47 and the making and loading of the new batch require an equal length of time. The two trucks are then advanced, leaving the truck 48 on the track 44 within the oven 40 and the truck 47 on the track 43 at the delivery end of said oven as indicated by dotted lines at $x$. Each of the trucks will at one time or another occupy a position between the first and second coat ovens as indicated at $x$. The dried first coat cores are then removed from the truck 47 (or 48, as the case may be) black-washed, provided with the second coat on the second coat core bench 34 and placed upon one of the trucks, 49 or 50, as the case may be, of one of the second coat ovens 41 (say the truck 49 of the intermediate second-coat oven). When this latter truck is loaded with a batch of second-coated cores it will be run into the oven and dried, and then run out to be loaded with first coated cores at the delivery end of the oven, where cores are black-washed and thus completed. The aforesaid truck 47 after having its load transferred to the aforesaid truck 49, is run back into position to receive a new batch of first coat cores from the bench 33. These operations may be carried on in rotation so that there is no loss of time on the part of the workmen and each oven may always contain a batch of cores, excepting for the time consumed in running the trucks into and out of them. This carrying on of the process in rotation and without loss of time, heat or floor space, or the use of unnecessary equipment is made possible by using a greater number of ovens than there are core benches so that the extra oven (or ovens) and its accessories is common to and adapted to assist in serving a plurality of core benches.

In the drawings I have shown a plurality of ovens arranged in banks of three, together with their necessary paraphernalia for serving each two gangs of core makers, so that when a truck load of first-coat cores emerges from a first coat oven, and are unloaded therefrom one at a time, another truck will be standing upon an adjacent track of a second coat oven in readiness to receive them after receiving their second coats. They may, however, be reloaded onto the same car, but this would entail a loss at one point or another. Furthermore, by placing the first and second coat ovens far enough apart, both trucks from the first-coat oven being loaded in readiness to be run into the second coat oven might stand on the same track, end to end, between the first and second coat ovens, but this also would entail a loss.

I do not claim as my invention a foundry plant having a truck or trucks, an elevated track rail or rails on which the truck or trucks operate, a flask or flasks supported upon the said truck or trucks in vertically suspended position with reference to said rail or rails and means for advancing the truck or trucks intermittently step by step along said rails, nor do I claim the elements recited in combination with means, such as bogies, for transferring the trucks from one set of track rails to another, or for progressing them along the track rails intermittently, step by step, or devices, such as molding, blacking, drying, head and core setting and casting devices, positioned at various points along said track rails or system.

What I claim as new and desire to secure by Letters Patent is:

1. A system of apparatus for casting pipe, having a plurality of trucks, a plurality of horizontal elevated stationary tracks upon which the trucks run, a plurality of flasks supported by and depending from said trucks vertically with respect to said tracks, a plurality of comparatively short movable tracks located at opposite ends of the stationary tracks and parallel therewith, and means for supporting the movable tracks at the same horizontal level as the stationary tracks, said supporting means being movable whereby the movable tracks may be brought to register, end to end, with any of the stationary tracks to form continuations thereof.

2. A system of apparatus for casting pipe, having a plurality of elevated horizontal stationary tracks, flasks depending vertically from said tracks, a plurality of comparatively short movable tracks located at opposite ends of the stationary tracks and in lines parallel therewith, transfer trucks supporting the movable tracks at the same horizontal level as the stationary tracks, and depressed transfer tracks upon which said transfer trucks run, whereby the movable tracks may be brought to register, end to end, with any of the stationary tracks and form continuations thereof.

3. A system of apparatus for casting pipe, having a plurality of elevated horizontal stationary tracks, trucks running upon said tracks, flasks depending from said trucks, a plurality of comparatively short movable tracks located at opposite ends of the stationary tracks and in lines parallel therewith, transfer trucks supporting the movable tracks at the same horizontal level as the stationary tracks, said trucks having frames extending from said level downward to a level below the lower ends of the flasks, transfer tracks, located below the level last aforesaid, upon which said trucks run whereby the movable tracks may be brought to register, end to end, with the stationary tracks and form continuations thereof, said transfer tracks being arranged transversely with relation to the stationary tracks.

4. A system of apparatus for casting pipe, having a plurality of elevated horizontal and parallel stationary tracks, trucks having supporting rollers, resting upon said tracks, a plurality of flasks depending vertically from said trucks, a plurality of comparatively short movable tracks located at opposite ends of the stationary tracks and in lines parallel therewith, transfer trucks supporting the movable tracks at the same horizontal level as the stationary tracks, said trucks having frames which extend from said level downward to a level below the lower ends of the flasks and upward to a level above the upper ends of the flasks, the upper portions of said frames having suitable braces, transfer tracks, located below the level of the lower ends of the flasks, upon which said trucks run whereby the movable tracks may be brought to register, end to end, with the stationary tracks and form continuations thereof, said transfer tracks being arranged transversely with relation to the stationary tracks.

5. An apparatus for casting pipe, having a plurality of parallel horizontal stationary tracks, a plurality of comparatively short tracks located opposite the ends of said stationary tracks and in lines parallel therewith, transfer trucks supporting the movable tracks at the same horizontal level as the stationary tracks, said trucks being movable whereby the movable tracks may be brought to register, end to end, with the stationary tracks and form continuations thereof, said stationary tracks having successive sections on which the flask is supported while the several successive essential steps in the process are being performed, and suitable apparatus appropriate for the performing of said steps located in proximity of the several sections of the stationary tracks appropriate to perform them, respectively, whereby as the flasks are advanced upon said rails, step by step, the several operations are performed consecutively.

6. An apparatus for making pipe, having a plurality of parallel stationary tracks adapted to support the flasks, a plurality of comparatively short movable tracks located at opposite ends of said stationary tracks, movable means for supporting the movable tracks whereby they may be brought into vertical alinement with the stationary tracks, a full complement of flasks for continuously carrying on the several successive steps of the process, apparatus for forming the molds on the interior of the flasks, drying the molds, setting the cores, casting the pipes, drawing the core bars and drawing the pipes, all arranged in proximity to said tracks and in the consecutive order named, in combination with a system of apparatus for making the cores, the several parts of said system of apparatus for making the cores being arranged in a circuit which intercepts the circuit in which the several parts aforesaid are arranged, the point at which the cores are completed in one circuit being in proximity to the point at which the cores are set in the other circuit.

7. An apparatus for making cast pipe having a full complement of flasks for continuously carrying on the successive essential steps in the process of casting, a stationary track supporting the flasks and upon which the flasks are adapted to be advanced in successive order, and suitable apparatus for, respectively, filling and ramming the flasks, drying the molds, setting the cores, casting the molten metal, drawing the core bars and drawing the cast pipes, all of said apparatus being arranged in the consecutive order named and in proximity to the supporting track, in combination with a system of apparatus for making the cores, said system of apparatus including alined core ovens, tracks passing through said ovens and projecting beyond both the receiving and delivery ends of the ovens and core trucks mounted to run upon said tracks, those portions of the tracks which extend beyond the delivery end of the final oven being in proximity to the apparatus for setting the cores.

8. A plant for making pipe, having a casting system comprising an elevated stationary track, a full complement of flasks for continuously carrying on the successive essential steps of the casting process, said flasks resting upon said track and adapted to be advanced thereon in successive order, apparatus for performing the respective essential steps arranged in proximity to said track and in the essential-order or sequence in which said steps must be taken, in combination with a system of apparatus for making the cores, said apparatus having an oven open at its opposite ends for receiving and delivering the cores, a track extending through said oven and beyond the opposite ends thereof, by which the cores are supported in transit during the process of drying them, and a crane common to both the casting and the core making systems, said crane having a sufficient sweep or range of travel to enable it to remove the completed cores from their positions at the delivery end of the oven and set them in the molds in the flasks while the latter rest upon the track of the casting system.

WILLIAM E. CLOW.

Witnesses:
CHARLES M. ALAND,
L. M. HOPKINS.

Copies of this patent may be obtained for five cents each, by addressing the "Commissioner of Patents, Washington, D. C."